United States Patent
Mukherjee et al.

(10) Patent No.: US 7,421,736 B2
(45) Date of Patent: Sep. 2, 2008

(54) METHOD AND APPARATUS FOR ENABLING PEER-TO-PEER VIRTUAL PRIVATE NETWORK (P2P-VPN) SERVICES IN VPN-ENABLED NETWORK

(75) Inventors: Sarit Mukherjee, Morganville, NJ (US); Sanjoy Paul, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1368 days.

(21) Appl. No.: 10/188,128

(22) Filed: Jul. 2, 2002

(65) Prior Publication Data

US 2004/0006708 A1    Jan. 8, 2004

(51) Int. Cl.
G06F 9/00    (2006.01)
G06F 15/16   (2006.01)
G06F 17/00   (2006.01)

(52) U.S. Cl. ............................................. 726/15
(58) Field of Classification Search ................ 726/15
See application file for complete search history.

(56) References Cited

U.S. PATENT DOCUMENTS

| | | | | |
|---|---|---|---|---|
| 4,945,468 A * | 7/1990 | Carson et al. | ............ | 726/15 |
| 5,241,594 A * | 8/1993 | Kung | ............ | 713/151 |
| 5,684,950 A * | 11/1997 | Dare et al. | ............ | 726/10 |
| 5,793,763 A * | 8/1998 | Mayes et al. | ............ | 370/389 |
| 5,864,666 A * | 1/1999 | Shrader | ............ | 726/15 |
| 5,898,830 A * | 4/1999 | Wesinger et al. | ............ | 726/15 |
| 5,944,824 A * | 8/1999 | He | ............ | 726/6 |
| 6,003,137 A * | 12/1999 | Kawasaki | ............ | 726/15 |
| 6,035,405 A * | 3/2000 | Gage et al. | ............ | 726/15 |
| 6,041,054 A * | 3/2000 | Westberg | ............ | 370/389 |
| 6,061,796 A * | 5/2000 | Chen et al. | ............ | 726/15 |
| 6,079,020 A * | 6/2000 | Liu | ............ | 726/15 |
| 6,092,200 A * | 7/2000 | Muniyappa et al. | ............ | 726/15 |
| 6,119,160 A * | 9/2000 | Zhang et al. | ............ | 709/224 |
| 6,154,839 A * | 11/2000 | Arrow et al. | ............ | 713/154 |
| 6,158,011 A * | 12/2000 | Chen et al. | ............ | 726/15 |
| 6,173,399 B1 * | 1/2001 | Gilbrech | ............ | 713/153 |
| 6,182,226 B1 * | 1/2001 | Reid et al. | ............ | 726/15 |
| 6,226,296 B1 * | 5/2001 | Lindsey et al. | ............ | 370/401 |
| 6,226,748 B1 * | 5/2001 | Bots et al. | ............ | 726/15 |
| 6,226,751 B1 * | 5/2001 | Arrow et al. | ............ | 726/15 |
| 6,253,327 B1 * | 6/2001 | Zhang et al. | ............ | 726/14 |
| 6,317,838 B1 * | 11/2001 | Baize | ............ | 726/11 |
| 6,446,113 B1 * | 9/2002 | Ozzie et al. | ............ | 709/204 |
| 6,449,722 B1 * | 9/2002 | West et al. | ............ | 726/4 |
| 6,473,863 B1 * | 10/2002 | Genty et al. | ............ | 726/3 |
| 6,516,417 B1 * | 2/2003 | Pegrum et al. | ............ | 726/15 |
| 6,557,037 B1 * | 4/2003 | Provino | ............ | 709/227 |
| 6,615,357 B1 * | 9/2003 | Boden et al. | ............ | 726/15 |

(Continued)

OTHER PUBLICATIONS

Stevens, Richard, TCP/IP Illustrated, vol. 1, The Protocols, 1994, Addison-Wesley, pp. 7-9, 42-45.*

Primary Examiner—Nasser Moazami
Assistant Examiner—David Garcia Cervetti (57) ABSTRACT

A method for providing peer-to-peer virtual private network (P2P-VPN) services over a network. The method includes identifying subnet and host addresses for each user device requesting participation in a virtual private network (VPN) session. Once the subnet and host addresses are identified, a virtual private host (VPH) is initiated for each user device, where each VPH communicates with each user device via a respective tunnel through the network, thereby enabling secure communications between the user devices.

22 Claims, 6 Drawing Sheets

U.S. PATENT DOCUMENTS

| | | | |
|---|---|---|---|
| 6,631,416 B2 * | 10/2003 | Bendinelli et al. | 709/227 |
| 6,636,898 B1 * | 10/2003 | Ludovici et al. | 709/250 |
| 6,640,241 B1 * | 10/2003 | Ozzie et al. | 709/204 |
| 6,640,307 B2 * | 10/2003 | Viets et al. | 726/15 |
| 6,662,228 B1 * | 12/2003 | Limsico | 709/225 |
| 6,687,245 B2 * | 2/2004 | Fangman et al. | 370/356 |
| 6,701,437 B1 * | 3/2004 | Hoke et al. | 726/15 |
| 6,732,314 B1 * | 5/2004 | Borella et al. | 714/752 |
| 6,751,729 B1 * | 6/2004 | Giniger et al. | 713/153 |
| 6,754,831 B2 * | 6/2004 | Brownell | 726/15 |
| 6,823,462 B1 * | 11/2004 | Cheng et al. | 726/15 |
| 6,883,099 B2 * | 4/2005 | Terrell et al. | 726/15 |
| 6,948,003 B1 * | 9/2005 | Newman et al. | 709/250 |
| 6,954,790 B2 * | 10/2005 | Forslow | 709/227 |
| 2001/0009025 A1 * | 7/2001 | Ahonen | 713/161 |
| 2001/0016914 A1 * | 8/2001 | Tabata | 713/201 |
| 2001/0047486 A1 * | 11/2001 | Green et al. | 713/201 |
| 2001/0054158 A1 * | 12/2001 | Jarosz | 713/201 |
| 2002/0023210 A1 * | 2/2002 | Tuomenoksa et al. | 713/161 |
| 2002/0026503 A1 * | 2/2002 | Bendinelli et al. | 709/220 |
| 2002/0026531 A1 * | 2/2002 | Keane et al. | 709/250 |
| 2002/0029276 A1 * | 3/2002 | Bendinelli et al. | 709/227 |
| 2002/0032725 A1 * | 3/2002 | Araujo et al. | 709/203 |
| 2002/0053030 A1 * | 5/2002 | Weng et al. | 713/201 |
| 2002/0053031 A1 * | 5/2002 | Bendinelli et al. | 713/201 |
| 2002/0053034 A1 * | 5/2002 | Mizukoshi | 713/201 |
| 2002/0056008 A1 * | 5/2002 | Keane et al. | 709/245 |
| 2002/0066030 A1 * | 5/2002 | Brawn et al. | 713/201 |
| 2002/0069278 A1 * | 6/2002 | Forslow | 709/225 |
| 2002/0091859 A1 * | 7/2002 | Tuomenoksa et al. | 709/245 |
| 2002/0099937 A1 * | 7/2002 | Tuomenoksa | 713/153 |
| 2002/0124090 A1 * | 9/2002 | Poier et al. | 709/228 |
| 2002/0129271 A1 * | 9/2002 | Stanaway et al. | 713/201 |
| 2002/0129272 A1 * | 9/2002 | Terrell et al. | 713/201 |
| 2002/0133534 A1 * | 9/2002 | Forslow | 709/200 |
| 2002/0141352 A1 * | 10/2002 | Fangman et al. | 370/254 |
| 2002/0141369 A1 * | 10/2002 | Perras | 370/338 |
| 2002/0144144 A1 * | 10/2002 | Weiss et al. | 713/201 |
| 2003/0041136 A1 * | 2/2003 | Cheline et al. | 709/223 |
| 2003/0055990 A1 * | 3/2003 | Cheline et al. | 709/229 |
| 2003/0110288 A1 * | 6/2003 | Ramanujan et al. | 709/238 |
| 2003/0177395 A1 * | 9/2003 | Pardee et al. | 713/201 |
| 2003/0188192 A1 * | 10/2003 | Tang et al. | 713/201 |
| 2003/0191937 A1 * | 10/2003 | Balissat et al. | 713/163 |
| 2003/0217105 A1 * | 11/2003 | Zircher et al. | 709/205 |
| 2003/0217148 A1 * | 11/2003 | Mullen et al. | 709/225 |
| 2003/0233572 A1 * | 12/2003 | Van Ackere et al. | 713/200 |
| 2003/0236820 A1 * | 12/2003 | Tierney et al. | 709/203 |
| 2004/0054902 A1 * | 3/2004 | Fujimoto et al. | 713/168 |
| 2004/0111519 A1 * | 6/2004 | Fu et al. | 709/229 |
| 2004/0117653 A1 * | 6/2004 | Shapira et al. | 713/201 |
| 2004/0158705 A1 * | 8/2004 | Burdett et al. | 713/151 |
| 2004/0160952 A1 * | 8/2004 | Borella et al. | 370/355 |
| 2004/0215957 A1 * | 10/2004 | Moineau et al. | 713/153 |
| 2004/0230841 A1 * | 11/2004 | Savini | 713/202 |
| 2004/0242203 A1 * | 12/2004 | Lipsanen et al. | 455/412.1 |
| 2005/0165953 A1 * | 7/2005 | Oba et al. | 709/238 |
| 2005/0237955 A1 * | 10/2005 | Shapira et al. | 370/299 |
| 2006/0075484 A1 * | 4/2006 | Yang | 726/15 |

* cited by examiner

METHOD AND APPARATUS FOR ENABLING PEER-TO-PEER VIRTUAL PRIVATE NETWORK (P2P-VPN) SERVICES IN VPN-ENABLED NETWORK

FIELD OF INVENTION

The present invention relates to virtual private networks. More specifically, the present invention relates to peer-to-peer virtual private networks.

DESCRIPTION OF THE BACKGROUND ART

Enterprises such as corporations, small businesses, government bodies, and other organizations using computer networks, currently utilize the public telecommunications infrastructure to form virtual private networks (VPN). A VPN is a private data network that allows an enterprise to provide connectivity amongst multiple sites, while maintaining privacy using a tunneling protocol and security procedures. The VPN gives the enterprise similar capabilities at a much lower cost by using a shared public infrastructure instead of a private infrastructure.

Currently, the VPN is limited to users within an enterprise organization. Specifically, tunneling protocols (e.g., point-to-point tunneling protocol (PPTP), layer two tunneling protocol (L2TP), and the like) allow the enterprise to extend their own network through private "tunnels" over the public internet. In effect a corporation uses a wide-area network (WAN) as a single large local area network (LAN). Accordingly, enterprise no longer needs to lease its own lines for wide-area communications, but can securely use the public networks. As such, any user of an access device (e.g., personal computer (PC), laptop, personal digital assistant (PDA), and the like) having point-to-point protocol client support is able to use an independent service provider to connect securely to a server elsewhere in the user's enterprise organization.

However, there is currently no capability to provide VPN connectivity to individuals outside an enterprise environment. For example, the general consumer, who is not affiliated with an enterprise, does not have the ability to communicate with others similarly situated using virtual private networks over the present public infrastructure (i.e., the internet). Multiparty conferencing and bridging of friends-and-family are services that are used to communicate among a group of members to disseminate information. These activities are generally carried over plain old telephone service (POTS) services, since a secure group communication mechanism over the Internet is not available. Accordingly, a method and apparatus for enabling peer-to-peer virtual private network services in a VPN-enabled network is desirable.

SUMMARY OF THE INVENTION

The disadvantages heretofore associated with the prior art, are overcome by the present invention of a method and apparatus for enabling peer-to-peer virtual private network (P2P-VPN) services in a VPN-enabled network. The method includes identifying subnet and host addresses for each user device requesting participation in a virtual private network (VPN) session. Once the subnet and host addresses are identified, a virtual private host (VPH) is initiated for each user device, where each VPH communicates with each user device via a respective tunnel through the network, thereby enabling secure communications between the user devices.

The apparatus includes a virtual internet protocol (IP) service agent (VISA). In particular, the VISA resides and operates in a controller having a processor and memory. The VISA provides peer-to-peer virtual private network (P2P-VPN) services to individuals over an IP network and includes a virtual private host (VPH) bank having at least one virtual private host (VPH). Each VPH allocates an IP address comprising a subnet and host address, and forms an end-point of a tunnel to a user device over the IP network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides peer-to-peer virtual private network (P2P-VPN) services to individual customers. In particular, the present infrastructure of a service provider is augmented with a computer device having a virtual IP service agent (VISA) residing in memory therein. The VISA manages and controls the P2P-VPN service in conjunction with the infrastructure and a public network.

The P2P-VPN service allows individual customers to requests the P2P-VPN service from the service provider, provided, for example, as a service for a monthly fee (similar to customer phone service). Alternatively, the individual customer can order such service on an on-demand basis. It is noted that the P2P-VPN services of the present invention differ from current P2P-VPN services in that any individual who is not affiliated with an enterprise, such as a corporation, government body, or other organization environment, may also receive P2P-VPN services. Although the invention is discussed in terms of a peer-to-peer network, one skilled in the art will appreciate that the invention is also applicable to client/server networks.

A service provider provides the P2P-VPN services of the present invention over a network, such as the public Internet. The services include a set of IP addresses, which are owned and may be used by the individual user and persons authorized by the owner. The number of the addresses assigned to a user depends on the user's requirements. For purposes of better understanding the invention, the term "Group (U)," is alternately used to signify the set of IP addresses that can be used by the individual user.

The VPN service treats Group (U) as a private network by allowing secure communications within addresses from Group (U), as well as ensuring no unauthorized communication between members of Group (U) and other customers (e.g., Group (V), where U and V are two different user groups, and V is not authorized to use U's network). The Group (U) may be expanded and reduced by the Group (U) owner and/or the service provider. Furthermore, communications between one or more members of Group (U) and members from Group (V) may be provided with proper authorization from U and V. Other embodiments and modifications will be discussed below and appreciated by those skilled in the art.

Figure 1:
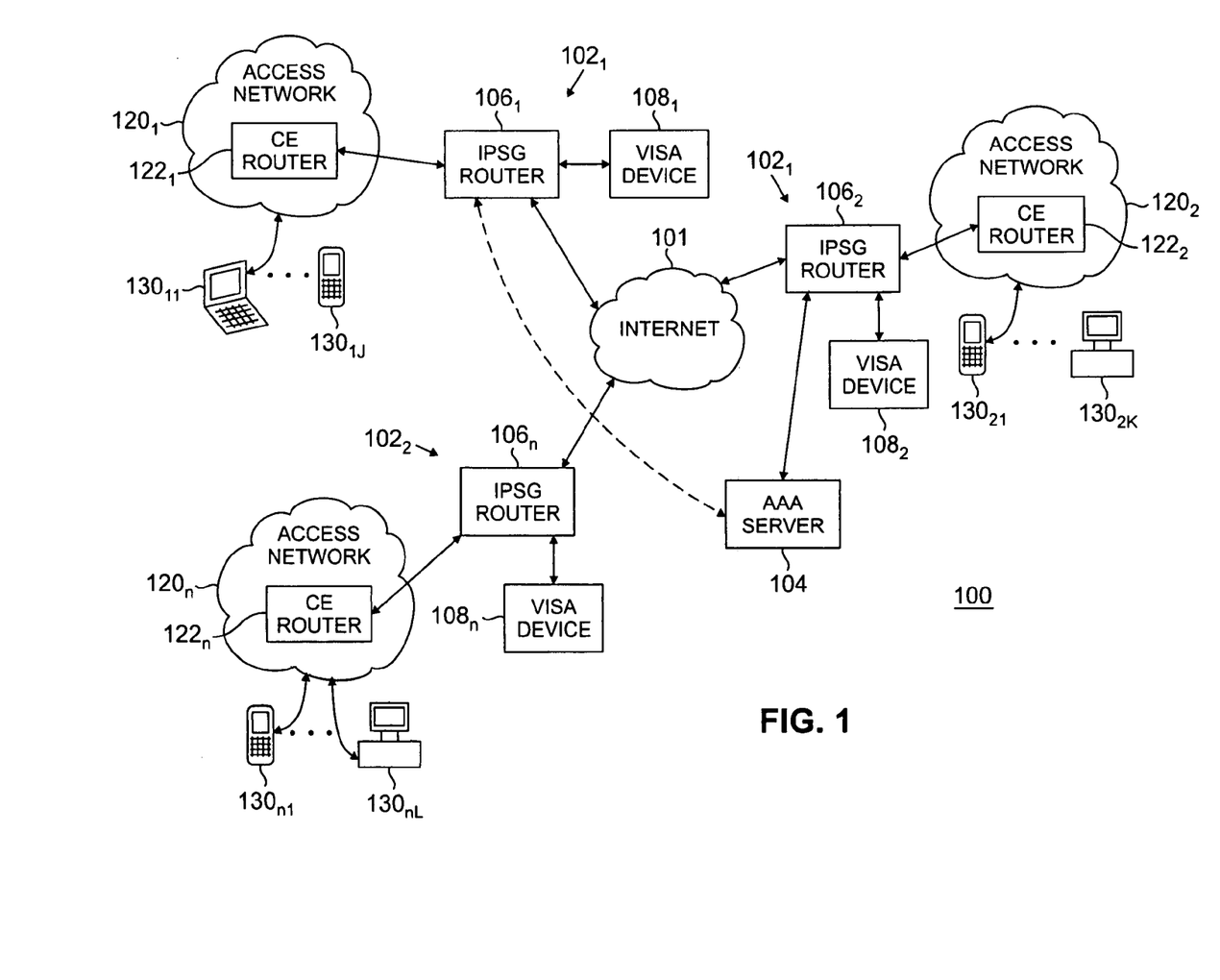
FIG. 1 depicts an exemplary communications network environment in which the present invention may be employed.

FIG. 1 depicts an exemplary communications network environment 100 in which the present invention may be employed. The communications network environment 100 comprises an Internet service provider (ISP) 102, a plurality of access networks $120_1$ through $120_n$ (collectively access networks 120), and a plurality of end user devices 130.

The end-user devices 130 may be any computer devices able to connect to a service provider 102, such as a device having point-to-point client support or a cable modem attached to a PC, which may not run point-to-point client. The end-user devices, may include, but are not limited to, a desktop PC, a laptop, a PDA, and the like. The end-user device 130 serves as an interface for receiving the P2P-VPN services. That is, information such as audio, video, text, and data, may be communicated privately, as well as securely between those authorized users in a particular group, (i.e., Group (U)) via the P2P-VPN service.

In FIG. 1, a plurality of end-user devices 130 are illustratively shown and coupled to each access network 120. For example, end-user devices $130_{11}$ through $130_{1j}$ are coupled to a first access network $120_1$, end-user devices $130_{21}$ through $130_{2k}$ are coupled to a second access network $120_2$, and end-user devices $130_{n1}$ through $130_{nk}$ are coupled to an "$n^{th}$" (e.g., third) access network $120_n$ (where i, j, k, l, and n are integers greater than zero).

The end user devices 130 are provided with input/output (I/O) devices and software (not shown) for interfacing with the access network 120. It is noted that the first subscript of the end-user device 130 represents the access network 120 the device 130 is accessing, while the second subscript represents the device on the access network 120. For example, an end-user device designated $130_{23}$ refers to a third end-user device coupled to the second access network $120_2$. The access network 120 may provide connectivity to the ISP 102 via POTS (analog modems), ISDN (Integrated Services Digital Network), ADSL (Asymmetric Digital Subscriber Line), cable, satellite, wireless data link, and the like.

Typically, the access networks 120 are regionally located and facilitate Internet access to a plurality of end user devices. Each access network 120 comprises a customer edge (CE) router 122 for routing traffic between one or more end user devices 130 and the service provider 102 via the Internet 101.

The service provider 102 is a company that provides individuals and other enterprises access to the Internet 101 and other related services, such as virtual hosting. The ISP may own or lease the necessary equipment to provide telecommunication line access, which is required to have point-of-presence on the Internet 101 for the geographical area served. The ISP may be a telecommunication provider, such as Verizon, Inc. of New York, N.Y. Alternately, the ISP 102 may be a national ISP having their own high-speed leased lines, such as AT&T WorldNet, IBM Global Network, MCI, Netcom, UUNet, PSINet, or a regional ISP, and the like.

The ISP 102 comprises, or has access to, infrastructure including a plurality of core nodes (not shown), a plurality of provider edge (PE) routers $106_1$ through $106_n$ (collectively PE routers 106), an administrative database operating in a server 104, and a plurality of P2P-VPN controllers $108_1$ through $108_n$ (collectively P2P-VPN controllers 108). It is noted that the service provider 102 may also have connectivity to other PE routers 106 owned/leased by other service providers.

Each controller 108 comprises a virtual IP service agent (VISA) program of the present invention, as discussed below in further detail. The server 104 is an application server, such as a database and transaction server used for authentication, authorization, and accounting (AAA) functions.

The PE routers 106 and VISA devices 108 shown in FIG. 1 may represent routers either belonging to a common service provider 102 or multiple service providers. For example, a first service provider $102_1$ is illustratively depicted in FIG. 1 as including the PE routers $106_1$ and $106_2$ and VISA devices $108_1$ and $108_2$, while a second service provider $102_2$ includes the PE router $106_n$ and VISA device $108_n$. In this instance, the AAA server 104 belongs to the first ISP $102_1$.

The PE routers may be IP service gateway (IPSG) routers, such as a SPRINGTIDE™ IP service switch from Lucent Technologies Inc. of Murray Hill, N.J., USA or a SHASTA® switch from Nortel Networks Inc., of Canada. The PE routers are coupled to other nodes (i.e., core routers (not shown)) in the communications network 100, as is known by those skilled in the art. The IPSG routers 106 and CE routers 122, which provide a point-of-presence (access point to/from the Internet 101) for the end user device 130, route data traffic therebetween.

The ISP infrastructure is augmented with the plurality of controllers 108 having the inventive virtual IP service agent (VISA) program residing in memory therein (hereinafter "VISA device" 108). Specifically, the VISA device 108 interconnects to the existing provider edge devices 106 and enables the P2P-VPN services. Once the existing infrastructure of a service provider 102 is augmented with the VISA devices 108, the existing infrastructure does not have to be upgraded, and is oblivious to the P2P-VPN service. The VISA devices 108 also emulate the end-points of a P2P-VPN session. Thus from the service provider's perspective, the VISA devices 108 make the users virtually service provider resident, regardless of the location where the users join.

Figure 2:
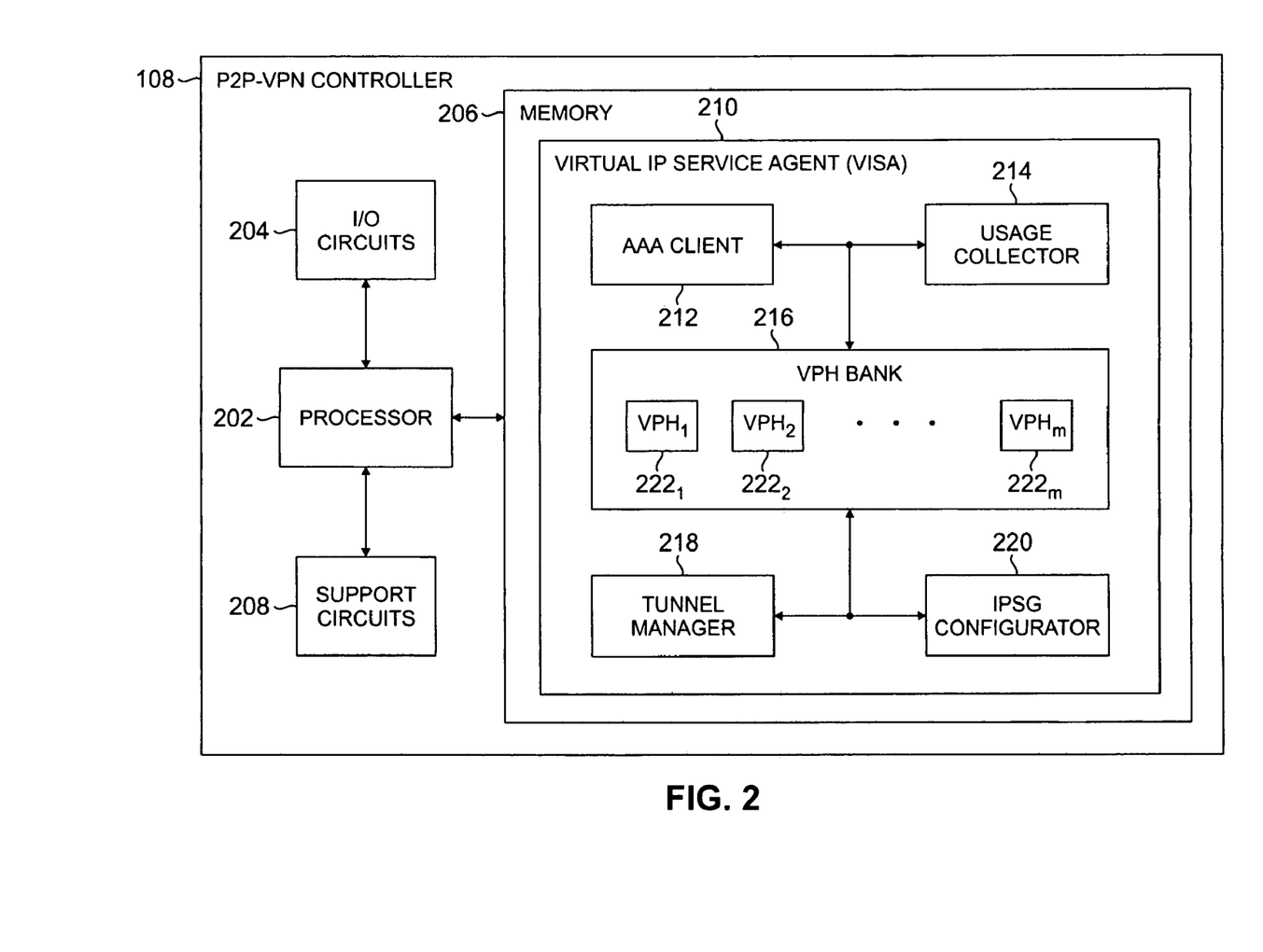
FIG. 2 depicts a block diagram of a virtual IP service agent (VISA) device used in the communications network of FIG. 1.

FIG. 2 depicts a high-level block diagram of a controller 108 suitable for use in the communications network 100 of FIG. 1. Specifically, the controller 108 (e.g., implementing the VISA device 108) of FIG. 2 comprises a processor 202, as well as memory 206 for storing various control programs and the VISA 210. The memory 206 may be volatile memory (e.g., random access memory (RAM)) and/or non-volatile memory, such as one or more disk drives or programmable memory, such as an electrically erasable programmable read-only memory (EEPROM), and the like. In FIG. 2, the VISA programming 210 is depicted stored in local memory in the controller 108.

The processor 202 cooperates with conventional support circuitry 208 such as power supplies, clock circuits, cache memory and the like, as well as circuits that assist in executing the software routines stored in the memory 206. As such, it is contemplated that some of the process steps discussed herein as software processes may be implemented within hardware, for example as circuitry that cooperates with the processor 202 to perform various steps. The controller 108 also contains input/output (I/O) circuitry 204 that forms an interface between the various functional elements communicating with the controller 108. For example, in the embodiment of FIG. 1, the controller 108 communicates with the IPSG PE router 106 and AAA server 104.

Although the controller 108 of FIGS. 1 and 2 is depicted as a general-purpose computer that is programmed to perform various control functions in accordance with the present invention, the invention may be implemented in hardware as, for example, an application specific integrated circuit (ASIC). As such, the processing steps described herein are intended to be broadly interpreted as being equivalently performed by software, hardware, or a combination thereof.

In one embodiment, the VISA program 210 comprises a plurality of software modules comprising an AAA client module 212, a usage collector module 214, a virtual private host (VPH) bank 216, a tunnel manager 218, and an IPSG router configurator 220. A person skilled in the art will recognize that any programming language and code may be used to implement the functional aspects of the plurality of software modules forming the VISA program 210. Further, one skilled in the art will recognize that a single module or combination of modules may be used to implement the functional aspects of the VISA program 210.

In particular, the AAA Client 212 collects authorization information from the user and contacts the AAA server 104 for authentication. The usage collector 214 interfaces with the AAA client 212 and tracks the usage of the VPN by the members of the group. The usage information is then sent to the AAA server 104 for administrative tracking and billing.

The virtual private host (VPH) bank 216 creates and maintains a pool of virtual private hosts $222_m$ (where m is an integer greater than zero). Each VPH 222 is assigned an IP address and serves as an end-point for a user in a group. The VPH bank 216 may contain VPHs 222 representing users from a single group, users from various groups, or a combination thereof. The VPH bank 216 interfaces with the AAA client 212 and usage collector 214, as well as the tunnel manager 218 and the IPSG configurator 220.

The tunnel manager 218 creates and maintains a tunnel between each VPH 222 and the users in a particular group. Additionally, the tunnel manager 218 relays data back and forth between each tunnel created for a group during a P2P-VPN session. The IPSG configurator 212 interfaces with the IPSG router 106 to create and terminate the P2P-VPN sessions.

The individual who subscribes to the P2P-VPN services offered by the service provider 102 owns the service. The service is illustratively provided over the public Internet 101. The purpose of the P2P-VPN service is to allow the owner of such service to have private and secure communication with other persons over the Internet 101. As such, the owner of the service specifies how many additional persons may utilize the service, which thereby defines a group of users that are authorized by the owner.

It is noted that the P2P-VPN services disclosed herein differ from the current VPN services that reside within the realm of an enterprise, such as a corporation. In particular, the enterprises use their own intranet and extranet resources to communicate with individuals within their own enterprise. By contrast, the P2P-VPN services of the present invention allow any individual who has access to the Internet 101 from any location to initiate and own a P2P-VPN. That is, in one embodiment a service provider 102 sells the services to individuals without having any required affiliation to an enterprise (i.e., the private or governmental sector) and who want to have secure and private communications over the Internet 101. The sale of P2P-VPN services in this manner may be considered analogous to a public telephone service, where any individual may make a private call to another through the phone lines of a phone company (service provider).

Figure 3:
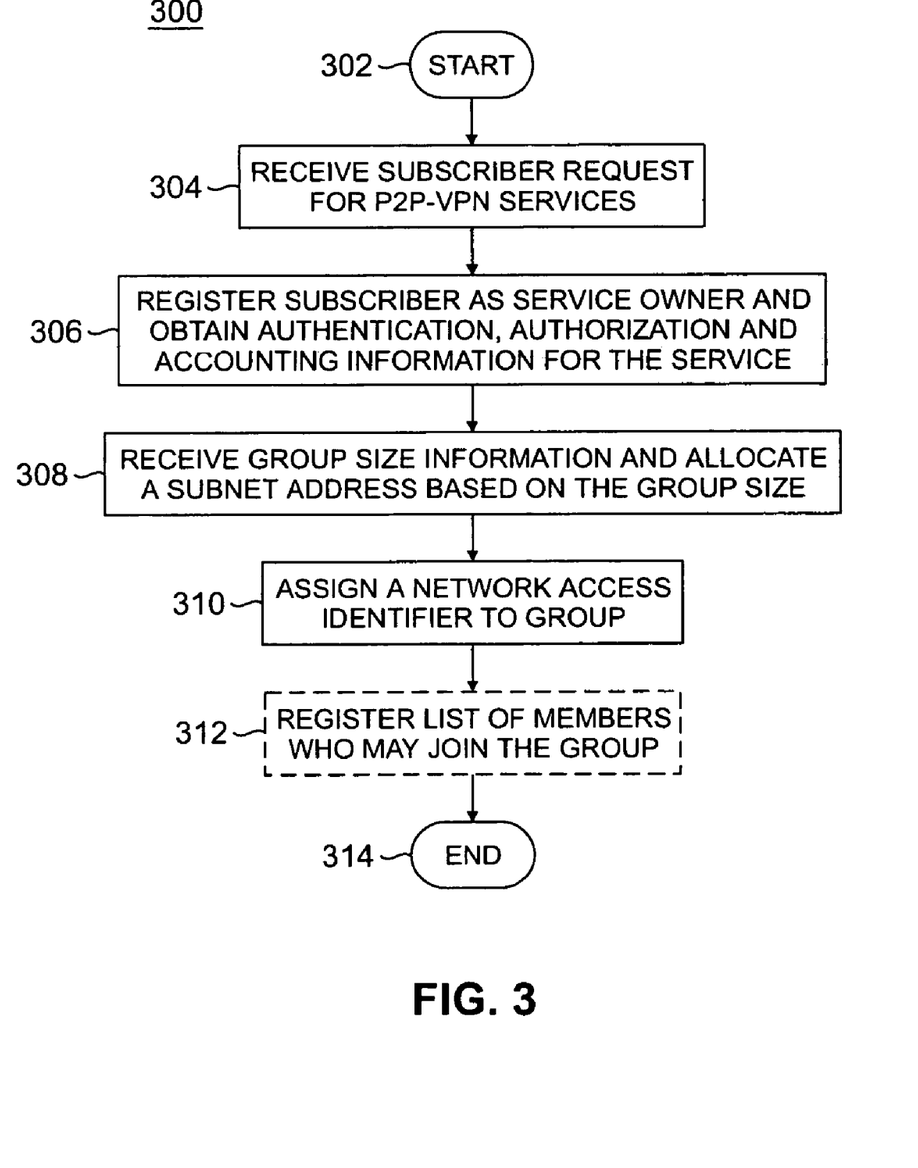
FIG. 3 depicts a flow chart of a method for an individual to obtain peer-to-peer virtual private network (P2P-VPN) services from a service provider.

FIG. 3 depicts a flow chart of a method 300 for an individual to obtain peer-to-peer virtual private network (P2P-VPN) services from a service provider 102. The method 300 starts at step 302, where an individual wishes to subscribe to the P2P-VPN services offered by the service provider 102. At step 304, the service provider 102 receives an initial subscriber request for the P2P-VPN services. The subscriber may subscribe to the service provider 102 using various techniques, such as telephoning the service provider or registering on the service provider's Internet web page.

Once the service provider 102 receives the subscription request, at step 306, a registration process is initiated. In particular, the subscriber provides personal information for authentication, authorization, and accounting purposes. The authentication information may comprise information such as a service ID number, mother's maiden name or any other information that may be used to authenticate the subscriber as the owner and user of the services. The authorization information may comprise a password and the like. The accounting information comprises billing information and the like. The AAA client 212 of the VISA program 210 collects the authorization and registration information from the subscriber and forwards the information to the AAA server 104, where the information is stored.

At step 308, the registration process continues when the subscriber identifies a group of users authorized to utilize the service. In one embodiment, the subscriber may provide an offline list of members (e.g., names) that the subscriber wishes to authorize to use the P2P-VPN service. In this instance, the member list is registered with the service provider 102 prior to the initiation of any group communications.

In a second embodiment, the list of members may be registered online. Specifically, the subscriber may allow the entry of other members into the group while the service is in progress. In this second embodiment, during registration, the subscriber needs only provide the total number of individuals in the user group. The service provider 102 dynamically provides member access to those authorized members after a session has begun, as discussed below in further detail.

Once the user group size is established, the service provider 102 allocates a subnet address based on the group size. In particular, the IP address currently used on the Internet protocol version 4 (IPv4) is a 32-bit number, which identifies each sender or receiver of information that is sent in packets across the Internet 101. The IP address has two parts, where the subnet address refers to the identifier of a particular network on the Internet 101, while the host address (i.e., local or machine address) refers to a unique identifier of a particular device within that network. Those skilled in the art will appreciate that the address will be modified in response to changes in IP addressing structure.

The IP address is currently expressed as four decimal numbers (e.g., 125.40.73.4) commonly known as the dotted quad address. Each decimal value that is separated by the periods represents an eight-bit sequence for each quad. For example, the second quad having a decimal number of 40 represents the byte {00101000}.

There are different address classes, where the first three classes are used to define the size of the network and number of devices. For example, Class-A IP addresses are used for large networks with many devices, and the first quad (e bits) forms the subnet address, while the last three quads (24 bits) form the host address. Class-B IP addresses are used for medium-sized networks, and the first two quads (16 bits) forms the subnet address, while the last two quads (16 bits) form the host address. Class-C IP addresses are for small networks with less than 256 devices, where the first three quads (24 bits) form the subnet address, while the last quad (8 bits) forms the host address. Other classes may be uses as they become available.

The VISA device 108 allocates the bits required for the host address based on the group size, and then uses the remaining bits to define the subnet address to define a particular group. In particular, the AAA client 212 provides the number of users in the group to the VPH bank 216, which then allocates the IP address for the particular group based on the group size. For example, if the IP address is a Class-C format, then the first three quads are usually designated as the subnet. If the user wishes to form a group having six (6) users, then the VISA device 108 will illustratively allocate the last three (3) bits of the standard host address as the actual host address, while using the remaining 29 bits to define the subnet address (i.e., 32−3=29). Thus, in the example above, the IP address 125.40.73+the first five bits of the last quad (typically reserved as the host address) form the subnet address. This subnet address is shared by all of the users in the group. That is, the subnet is assigned to the owner of the P2P-VPN session, while the last three bits define the host address for the end-user devices 130 in the group.

More specifically, for a session to occur, there must be two or more users. Thus, the first user (i.e., the owner) may be assigned a host address=1 (bits 001), while the second user is assigned host address=2 (bits 010), and so forth, up to where the sixth user is assigned host address=6 (bits 110). One skilled in the art will recognize that as more users join a group, the number of bits required increases to identify each of the users by a unique host address. For example, if eleven (11) users form the group, then four bits are allocated to the host address, and the eleventh user's host address is, illustratively, bits 1101. In this case, the first 28 bits are available to define the subnet address for the user group. As such, the VISA device 108 is able to dynamically assign the subnet address for the group and the host addresses for the end-user devices 120, based on the size of the user group.

At step 310, the user group is assigned a network access identifier (NAI). The NAI corresponds to the dotted quad notation, and may be characterized by the user name and service provider domain name, such as "user_name@service_provider.com". The VISA program 210 is capable of making name-to-IP address translations, therefore, the users do not need to maintain devices such as domain name servers (DNS) to translate domain names, dynamic host configuration protocols (DHCP) to provide IP addresses, routers to route packetized information, and the like. Rather, a user simply buys (subscribes to) the services from the service provider 102, where the required infrastructure exists. Furthermore, by providing an NAI for the group, the users may easily connect to the P2P_VPN network from anywhere in the world, as well as join and leave the VPN at any time (i.e., 24×7 service) from any end-user device 130 using wireless or wired access networks 120.

At optional step 312, the service provider will register the names of members who may participate in the P2P-VPN services. The owner of the service has the authority to add or delete members of the group (though this authority may be delegated). As discussed above, the member list may be added prior to the session occurring (i.e., at registration) or subsequently, for example, during a current session. Once the subscriber completes the registration process, the subscriber is deemed the owner of the P2P-VPN service. The method 300 then proceeds to step 314, where the method ends.

Figure 4A:
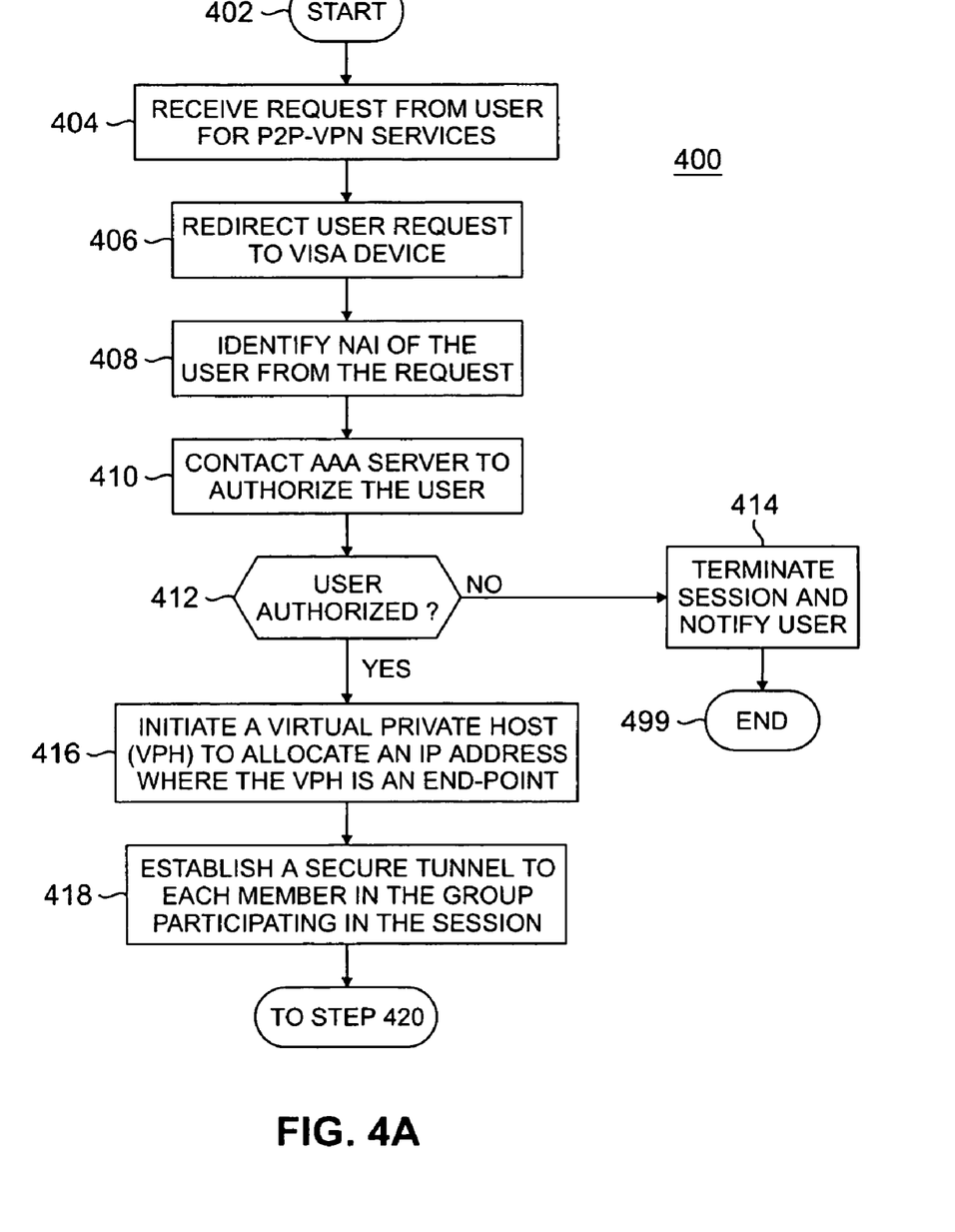
FIGS. 4A and 4B collectively depict a flow chart of a method for providing P2P-VPN services to authorized members of a group over the Internet.
Figure 4B:
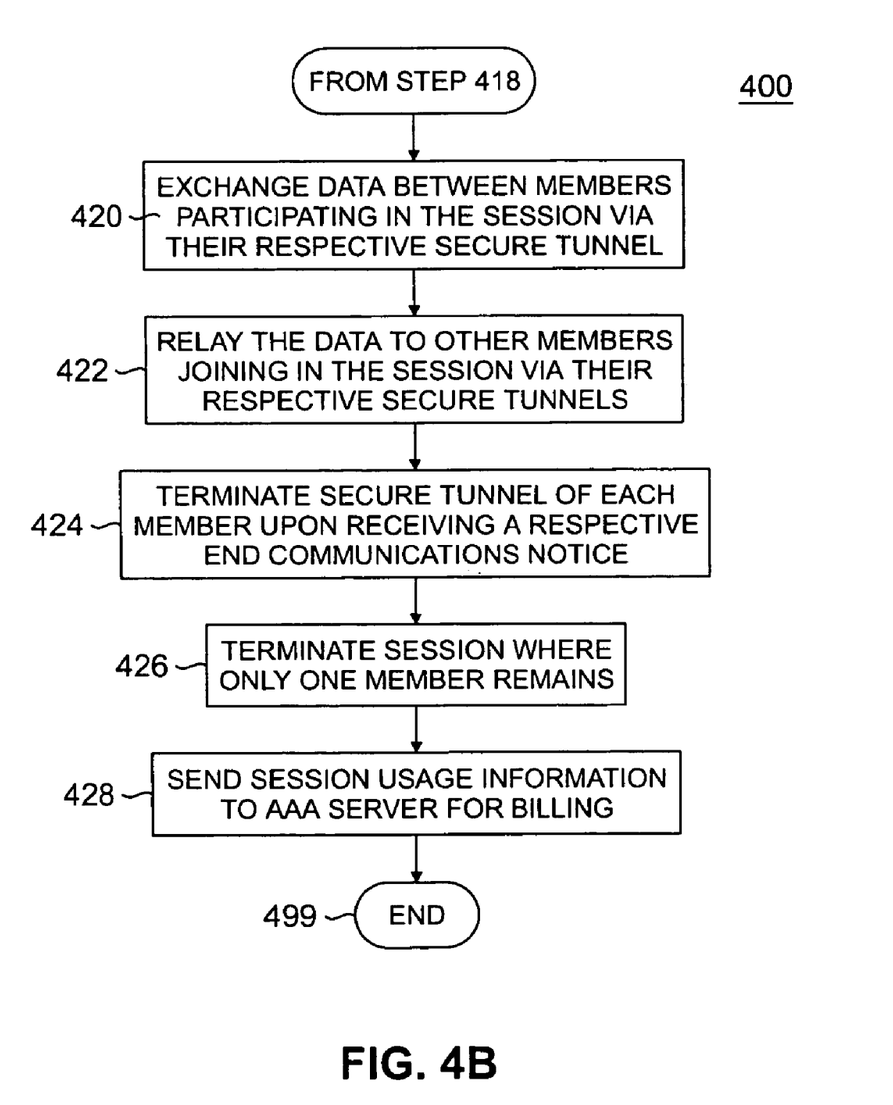

FIGS. 4A and 4B collectively depict a flow chart of a method 400 for providing P2P-VPN services to authorized members of a group over the Internet 101. The method 400 starts at step 402, where it is assumed that a subscriber to the services has registered and is the owner of a user group, as discussed above with regard to method 300 of FIG. 3.

At step 404, the service provider 102 receives a request from a user (i.e., owner) for a P2P-VPN session. Each user in the group participating in the P2P-VPN session, utilize their end-user device 130 (e.g., PDA, desktop PC) to enter the NAI to access the service provider 102 over the Internet 101. The request for service is sent to the access network 120 and routed by the CE router 122 to the IPSG PE router 106 of the service provider 102. At step 406, the IPSG PE routers redirect the user request to the P2P-VPN controller 108 for control and management of the P2P-VPN session by the virtual IP service agent (VISA) program 210.

At step 408, the IPSG configurator 220 of the VISA device 210 identifies the user request by the network access identifier (NAI), and at step 410, the AAA client 212 of the VISA program 210 contacts the AAA server 104 for authentication. The method then proceeds to step 412.

At step 412 the AAA server 104 determines whether the user making the request is authorized. The AAA server 104 checks the registration information stored therein, and if the user is not authorized, the AAA server 104 sends a non-authorization message to the IPSG configurator 220. At step 414, the IPSG configurator initiates a termination message back to the non-authorized user via the IPSG PE router 106. The IPSG PE router then routes the termination message back to the non-authorized end-user, and at step 499, the method ends.

If at step 412, the end-user is authorized for P2P-VPN services, then the method proceeds to step 416. At step 416, a virtual private host (VPH) 222 is initiated for each participant in the session. The VPH bank 216 creates and maintains a pool of VPHs, where each VPH 222 emulates an end-point of the session. That is, the VPH 222 allocates an IP address (i.e., subnet and host address) to itself. When a real user joins the session, either the IP address of the VPH 222 is allocated to the real user, or if the user already has an IP address, the VPH 222 is mapped to the user in the group. As far as the infrastructure of the service provider 102 is concerned, the VPN end-points are a group of VPHs with IP addresses from the group of users.

At step 418, the tunnel manager 218 establishes a secure tunnel to each member in the group participating in the session. That is, a single tunnel (private and secure channel) is created from a VPH 222 in the VPH bank 216 to participating users in the group. In other words, each VPH 222 serves as one end-point of a user tunnel, where the user is the other end-point. The IP address allocated by the VPH 222 may then be attached to the information (packets) sent through the secure tunnel.

It is noted that only the owner of the group is able to initiate the session. The other members are invited to participate in the active session, illustratively, by instant messaging service, e-mail, or some other means of notifying the other members that P2P-VPN services have been initiated. At least one other member must respond to the invitation for the session to proceed. If all the other members fail to respond to the invitation, the owner's session times out.

Figure 5:
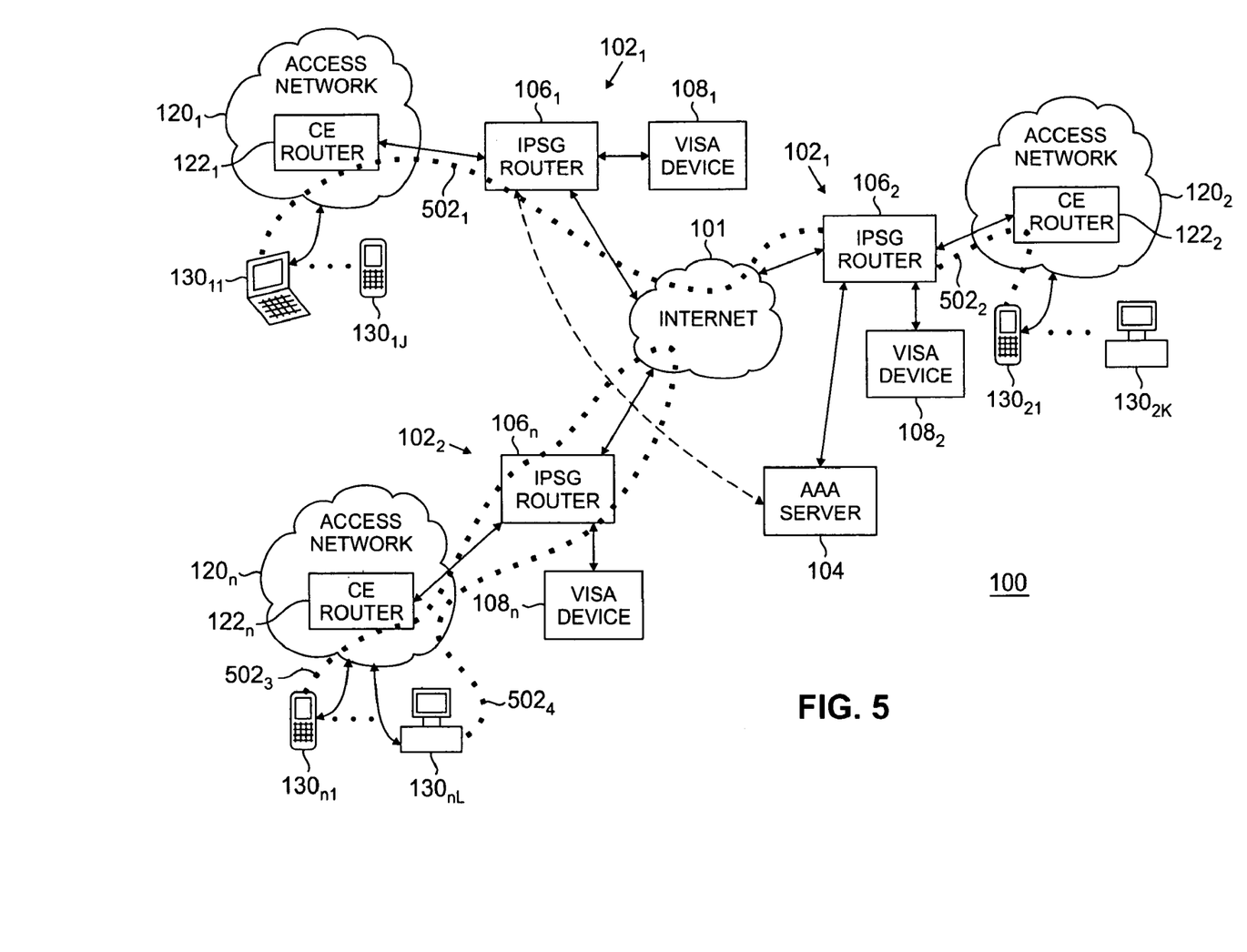
FIG. 5 depicts the exemplary communications network environment of FIG. 1 illustrating a plurality of VPN tunnels of the present invention.

FIG. 5 depicts the exemplary communications network environment of FIG. 1 illustrating a plurality of VPN tunnels of the present invention. FIG. 5 is the same as FIG. 1, except that a plurality of illustrative VPN tunnels 502 are included. In particular, a first tunnel $502_1$ is depicted extending from a first end user device $130_{11}$ to the IPSG PE router $106_1$, and a second tunnel $502_2$ is depicted extending from a second end user device $130_{21}$ to the IPSG PE router $106_2$.

For example, the owner of user Group U illustratively having an end-user device, such as laptop computer $130_{11}$ establishes a P2P-VPN session over the first access network $120_1$. An authorized second user in Group U, who wishes to participate in the session, illustratively using a PDA $130_{21}$, responds to the invitation and accesses the Internet 101 via a second access network $120_2$. A virtual private host (VPH) $222_1$ is created as a first end-point in the VPH pool $216_1$ of the VISA program $210_1$ at the VISA device $108_1$. Similarly, a VPH $222_2$ is created as a second end-point in the VPH pool $216_2$ of the VISA program $210_2$ at the VPN device $108_2$. Accordingly, each VISA program 210 initiates an end-point between itself (i.e., VPHs $222_1$ and $222_2$) and the end-user devices $130_{11}$ and $130_{21}$ in the Group U to initiate the session.

At step 420, the session is established between the owner and at least one other member in the group. At this time, the participants may exchange data via their secure tunnels. The owner illustratively sends a private and secure message, via the tunnel from the laptop PC $130_1$, to the IPSG router $106_1$. The IPSG router $106_1$ routes the message to the first VISA device $108_1$, where the tunnel manager $218_1$ of the VISA program $210_1$ controls the data traffic. The tunnel manager $218_1$ sends a command signal to the first IPSG router $106_1$ to extend the first tunnel $502_1$ to the second IPSG router $106_2$. It is noted that the PE routers 106 of the service provider 102 are assumed capable of providing different tunneling mechanisms and implementing tunnel switching. The VISA program $210_2$ at the second VISA device $108_2$ intercepts the routed message to the second IPSG router $106_2$ and initiates the second tunnel $502_2$ to the second end-user device $130_2$.

In particular, the VISA program $210_2$ initiates a VPH 222 in its VPH bank $216_2$, and the tunnel manager $218_2$ forms the second tunnel $502_2$ from the IPSG PE router $106_2$, through the CE router $122_2$, to the end-user device $130_{21}$. As such, P2P-VPN connectivity is provided for the session, and the data is exchanged between the participants in the group through the first and second tunnels $502_1$ and $502_2$.

Where more than two users participate in the session, additional VPHs 222 are created and maintained in the VPH bank 216 of the VISA device 108, which is associated with the PE router 106 of such user. In the example shown in FIG. 5, two independent VISA programs $210_1$ and $210_2$ were utilized to create the secure and private tunnels $502_1$ and $502_2$ for the session. However, the invention also addresses the embodiment where two or more users in a group utilize the same access network 120 and IPSG router 106 of a service provider 102 during a session.

Specifically, referring to FIG. 5, if two or more users in a group all access the Internet 101 via a common access network 120, then only a VISA program 210 residing, for example, in a single VISA device 108 associated with the common access network 120 is required. Such circumstance may occur where employees in an organization share the same access network 120 and wish to have secure and private communications over the Internet 101.

For example, if two or more users in a group desire P2P-VPN services and share a common access (i.e., co-located) to the third access network $120_n$ (where in this instance n=3), the third VISA device $108_{n=3}$ initiates two or more VPHs 222 in the VPH bank 216. That is, each user has a corresponding VPH 222 as an end-point, as discussed above. In this instance, a third tunnel $502_3$ is formed between a first end-user device $130_{n1}$ and the IPSG router $106_1$, and a second tunnel $502_4$ is formed between the IPSG router $106_1$ and the second end-user device $130_{nL}$ (where, in this example L=2). Additional tunnels 502 are formed for any additional users in the group participating in the session, as discussed above.

At step 422, other authorized members in the group may join the session. Each VISA device 108 corresponding to each new member creates a VPH 222, which dynamically assigns an IP address, and then generates a tunnel in the same manner as described above. As such, any authorized member of a group may join at any time, once the owner has initiated the session.

At step 424, each tunnel is terminated as each member of the group ends their participation in the session. In one embodiment, the user logs off, and a session termination is sent to the VISA program 210. The IPSG configurator 220 then terminates the session for that particular user in the group, and the tunnel manager 218 terminates the respective tunnel to such terminated user.

In a second embodiment, once the user logs off, the session times out. That is, the tunnel manager 218 tracks the session activity through the tunnel 502. If there is no activity for some predetermined period of time, then the tunnel manager 218 informs the IPSG configurator 220 to end the session for that user. The IPSG configurator 220 ends the session and notifies the tunnel manager 218 to terminate the tunnel.

At step 426, once there are less than two participants in the session, the IPSG configurator 220 ends the session in total. At step 428, the usage collector 214 forwards the session time to the AAA server 104 for billing purposes. Specifically, the usage collector 214 tracks the number of participants and the amount of time each participant spent utilizing the P2P-VPN services. The AAA server then provides the service provider 102 with the proper billing information to subsequently bill the owner of the group. It is noted that billing for a session may be based on a variety of metrics, such as, session time duration, group size (i.e., number of users), quality-of-service, bit-rate, a flat rate, tiered rate, bandwidth, an access charge, and the like, or a combination of such metrics. The method 400 then proceeds to step 499, where the method 400 ends.

The VISA device 108 performs a variety of functions. In particular, the VISA device 108 acts as a proxy for user authentication and authorization. Specifically, the VISA device 108 collects authorization information from the user, acts as a virtual user for the P2P-VPN service to the provider, and processes users' entry into and departure from the P2P-VPN service. Moreover, the VISA device 108 configures a user if it is not already configured, instructs an ISP edge device to initiate VPN to join the user, tunnels data to user if the user resides in a different service provider; and performs billing operations.

The P2P-VPN service may be used to securely communicate among a set of users over the public Internet 101, and provide Quality of Service (QoS) assurance within the VPN constructed around the Group (U). In essence, the VISA device 108 emulates a private network among a group of users over the public network (i.e., the Internet 101).

There are several scenarios where P2P-VPN may be used. For example, document sharing is a very popular application that encompasses the sharing and distribution of presentations, images, music, and the like. There are several applications built over the years to share documents with a group of users (e.g., whiteboard, napster, gnutella, and the like). The P2P-VPN service allows such an application to run securely within a group of authorized users over the public Internet 101.

Another advantage includes multiparty conferencing, and bridging of friends-and-family, and the like, which are services that are used to communicate among a group of members to disseminate information. Currently this type of service is usually carried over POTS services, since a secure group communication mechanism over the Internet 101 is not available. The P2P-VPN service enables such communication to go over the Internet 101 for significantly lower costs.

Multiple users may play popular recreational activities, such as games, over the Internet 101. In this environment it is desirable to have the game played among the authorized players and to propagate the moves each player makes securely to the authorized users only. The P2P-VPN service provides such a solution.

In a small office/home office (SOHO) environment, the user may have a number of IP-aware devices interconnected by some IP network. Note that it is not necessary that all the devices are geographically collocated or are connected by wireline networking only. It is desired that the user is able to communicate to the devices within and outside the SOHO environment. A P2P-VPN service ensures a secure private network built around the devices.

With the advent of home networking, small IP-aware home devices are becoming popular. Several public forums have discussed using automatic network configuration of these devices. In a home automation system, devices may communicate with each other on demand, or based on events, regardless of whether the devices are interconnected with or without wires, in a secure fashion. It is important that no intruder can monitor the network traffic, inject any traffic, or control the devices in an un-authorized way. The P2P-VPN provides a viable solution.

Further advantages of the P2P-VPN service may be measured both from the customers' (i.e, individual user) perspective and from the service providers' perspective. From individual user's perspective, the advantages include, but are not limited to, allowing any user to own and set up a network of his/her choice and enabling private and secure communications within a group of users and/or IP devices. Further, there are several applications that are used to communicate in a group over the insecure Internet 101. The P2P-VPN provides instant secure communication without changing the application or reprogramming the transport layer.

A quality of service guarantee over the P2P-VPN allows for a multitude of peer-to-peer services. Such services may include peer-to-peer radio, voice over IP (VoIP) group communication, linking up remotely to Digital Home Library, and the like.

Augmenting the P2P-VPN with automatic network configuration procedures can provide easy networking to users who lack detailed knowledge about networking. This service is analogous to plugging-in a new telephone to the jack and start using it without knowing/understanding how the public switched telephone network (PSTN) system works. This is especially suitable for SOHO and home automation applications.

From the service provider's perspective the advantages include, but are not limited to, crossing the limitation on IPv4 addresses. A service provider has a limited number of public IP addresses that it can distribute to its subscribers. In the P2P-VPN model, the service provider is able to allocate private as well as public IP addresses to the members of the groups. Moreover, "overlapping" of addresses is also possible. That is, the ISP's VPN devices (e.g. the IPSG 106) attach a unique per Group(U) VPN ID in front of the IP address and routes VPN packets with the VPN ID and IP address. Since each Group(U) is assigned a unique ID, the IP address of two groups may be same, and thereby overlap. Thus, the address space available to a service provider is substantially increased.

It is also noted that IP security (IPSec), multiprotocol label switching (MPLS), asynchronous transfer mode (ATM)/Frame Relay, IP-in-IP encapsulation, generic routing encapsulation (GRE), layer 2 tunneling protocol (L2TP), and general packet radio service (GPRS) tunneling protocol (GTP) are illustrative technologies that may be used to enable tunnels. One skilled in the art will appreciate that this is not an exclusive listing of tunneling technology. Moreover, the tunnel initiated by VPH may also provide quality of service to the user.

Although various embodiments that incorporate the teachings of the present invention have been shown and described in detail herein, those skilled in the art can readily devise many other varied embodiments that still incorporate these teachings.

What is claimed is:

1. A method for providing virtual private network (VPN) services, comprising:
   identifying a subnet address and a host address for each of a plurality of user devices that request participation in a virtual private network (VPN) session; and
   initiating a respective plurality of virtual private hosts (VPHs) for the respective user devices;
   wherein, for each of the user devices, the VPH initiated for the user device communicates with the user device via a respective tunnel through a network, thereby enabling secure communications between the user devices.

2. The method of claim 1, further comprising:
   authenticating each of the user devices; and
   generating the tunnels from the respective VPHs to those authenticated user devices that are authorized to participate in the session.

3. The method of claim 2, wherein said authenticating step further comprises translating a network access identifier into the subnet and host addresses for the user devices.

4. The method of claim 1, wherein said identifying step further comprises:
   identifying a number of user devices forming a group;
   computing a minimal number of bits in an IP address required to uniquely identify each user device of the group with a host address; and
   allocating at least some of the remaining bits in the IP address as a unique subnet address for the group.

5. The method of claim 1, wherein said initiating step comprises:
   assigning the subnet and host addresses to the respective user devices participating in said session; and
   designating each VPH as an end-point of the respective tunnel by supporting communications with the respective user device for which the VPH is initiated.

6. The method of claim 1, wherein the subnet and host addresses are statically assigned to respective authorized user devices during initiation of said session.

7. The method of claim 1, wherein the subnet and host addresses are dynamically assigned to allow new authorized user devices to join a session in progress.

8. The method of claim 1, further comprising terminating a tunnel of a user device exiting said session.

9. The method of claim 1, further comprising terminating said session when less than two user devices are participating in said session.

10. The method of claim 1, further comprising determining billing costs for said session based on billing metrics.

11. The method of claim 10, wherein said billing metrics comprises at least one of a session time duration, group size, quality-of-service, bit-rate, a flat rate, tiered rate, bandwidth, and an access charge.

12. The method of claim 10, wherein an individual subscribing to said session is designated an owner of said session.

13. The method of claim 1, wherein said network is at least one of an IP network, a client/server network, and a peer-to-peer network.

14. A computer readable medium storing a software program which, when executed by a computer, causes the computer to perform a method for providing virtual private network (VPN) services, the method comprising:
- identifying a subnet address and a host address for each of a plurality of user devices requesting participation in a virtual private network (VPN) session; and
- initiating a respective plurality of virtual private hosts (VPHs) for the respective user devices;
- wherein, for each of the user devices, the VPH initiated for the user device communicates with the user device via a respective tunnel through a network, thereby enabling secure communications between the user devices.

15. A virtual IP service agent (VISA) operating in a controller having a processor and memory, for enabling virtual private network (VPN) services over an IP network, comprising:
- a virtual private host (VPH) bank having a plurality of VPHs, each of the VPHs allocating an IP address to a respective user device associated with the VPH, each of the VPHs forming an end-point of a tunnel over the IP network to the respective user device associated with the VPH.

16. The VISA of claim 15, further comprising:
- an authentication, authorization, and accounting (AAA) client, interfacing with an AAA database of a service provider and said VPH bank, for authorizing generation of the VPHs for the respective user devices.

17. The VISA of claim 16, further comprising:
- a usage collector, interfacing with said AAA client and said VPH bank, for providing billing metrics to said AAA database.

18. The VISA of claim 17, further comprising:
- a tunnel manager, interfacing with said VPH bank, for establishing the respective tunnels between the VPHs and the respective user devices.

19. The VISA of claim 18, further comprising:
- an edge router configurator, interfacing with said tunnel manager and VPH bank, for creating and terminating each VPN session.

20. The VISA of claim 19, wherein:
- the edge router configurator identifies a session request from said device request by a network access identifier (NAI); and
- the AAA client interfaces with the AAA database for authentication.

21. The VISA of claim 15, wherein said IP network comprises the Internet.

22. An apparatus for providing virtual private network (VPN) services, comprising:
- means for identifying a subnet address and a host address for each of a plurality of user devices requesting participation in a virtual private network (VPN) session; and
- means for initiating a respective plurality of virtual private hosts (VPHs) for the respective user devices;
- wherein, for each of the user devices, the VPH initiated for the user device communicates with the user device via a respective tunnel through a network, thereby enabling secure communications between the user devices.

* * * * *